April 21, 1964   H. FOX   3,129,716
EXPLOSIVE ACTUATED VALVE
Filed Feb. 5, 1962

INVENTOR.
HARVEY FOX

BY

AGENT

United States Patent Office 3,129,716
Patented Apr. 21, 1964

3,129,716
EXPLOSIVE ACTUATED VALVE
Harvey Fox, Rockaway, N.J., assignor to Thiokol Chemical Corporation, Bristol, Pa., a corporation of Delaware
Filed Feb. 5, 1962, Ser. No. 171,076
2 Claims. (Cl. 137—68)

The present invention refers to a single operation or "one-shot" valve of the hermetically sealed type wherein the seal can be broken by remotely-controlled means to effect flow through the valve.

Valves of this general type are useful in propellant supply lines for rocket motors, liquid or gas supply lines of emergency equipment such as might be used in aircraft, space or land vehicles, and, in fact, in any location where it is desired that a liquid or gas be hermetically sealed from a system and yet where flow must be initiated quickly and positively by remote means. A problem inherent in such a valve is to achieve all of the aforementioned qualities without impeding the flow through the valve after operation of the valve has been accomplished because of changes of flow direction and the presentation of partial obstructions in the flow path. The present invention solves this problem in a novel manner presents a flow passage straight through the valve and free of obstruction.

It is, therefore, an object of the present invention to provide an hermetically-sealed remotely-actuated single operation valve wherein the flow passage is straight through the valve.

It is also an object of the present invention to provide a valve of the foregoing type wherein no partial obstructions remain in the flow passage after operation of the valve.

It is an object of the present invention to provide a valve of the fore-going type which is completely leak proof, positive in operation, lightweight and relatively inexpensive to construct.

Figure 1:
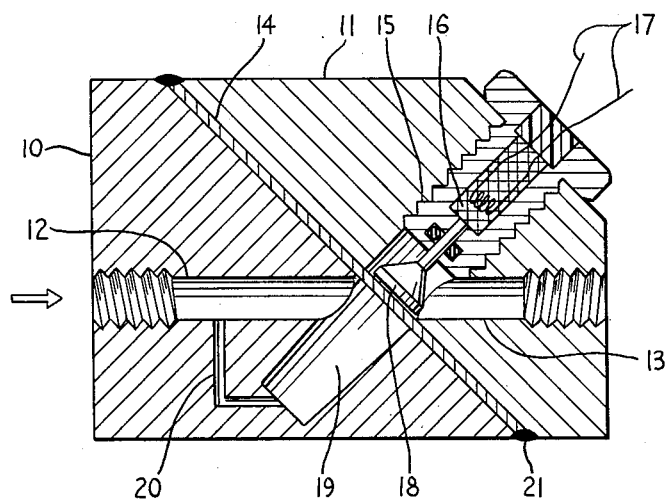
FIGURE 1 is a cross-sectional view of the valve in its sealed and closed condition.

One embodiment of the present invention is shown in FIGURE 1, wherein are shown an upstream body portion 10, a mating downstream body portion 11, flow passages 12 and 13 extending straight through each body portion and in substantial axial alignment with each other, and an hermetic seal member or frangible diaphragm 14 interposed between body portions 10 and 11 and fully blocking inlet passage 12 and outlet passage 13 in the manner shown. Seal member 14, at least in the area where it traverses the flow passage, is inclined to the common central axis of passages 12 and 13, preferably, but not necessarily, at an angle of 45 degrees, it being possible to use other inclination angles if desired so long as inclination is present. The purpose of the inclination is to provide a straight through flow passage and yet make it possible to break the hermetic seal and remove the broken piece and the means which broke it from the flow passage as is described later herein.

In body portion 11 is a charge retaining chamber 15 containing an electrically-operated exposive charge 16, the initiation signal to the charge 16 being carried by wires 17 which emanate therefrom. Also in chamber 15, and between charge 16 and diaphragm 14, is a ram 18 which is piston-like in form. Charge retaining chamber 15 is disposed with its longitudinal central axis substantially normal to the diaphragm 14 and is exposed to that area or portion of diaphragm 14 which blocks passages 12 and 13. Immediately on the opposite side of diaphragm 14 and in axial alignment with chamber 15, is a receiving chamber 19 large enough to completely and wholly receive both the fragment removed from diaphragm 14 and the ram 18. Chamber 19 is, however, tapered in diameter so that as the fragment and ram enter it and proceed toward it bottom, they become tightly wedged in it and are retained out of the straight through path of flow passages 12 and 13. Their retention in chamber 19 prevents them from being drawn downstreamwardly to obstruct flow. A vent 20 is provided to relieve the fluid pressure in chamber 19 to allow the fragment and ram to enter. The vent 20 comprises a passage 20 which connects chamber 19 with the interior of passage 12. While the vent could presumably be connected to the atmosphere or to outside of the valve, it is a feature of the present invention that it is routed inside the valve said that no dangerous or costly leakage can occur.

Figure 2:
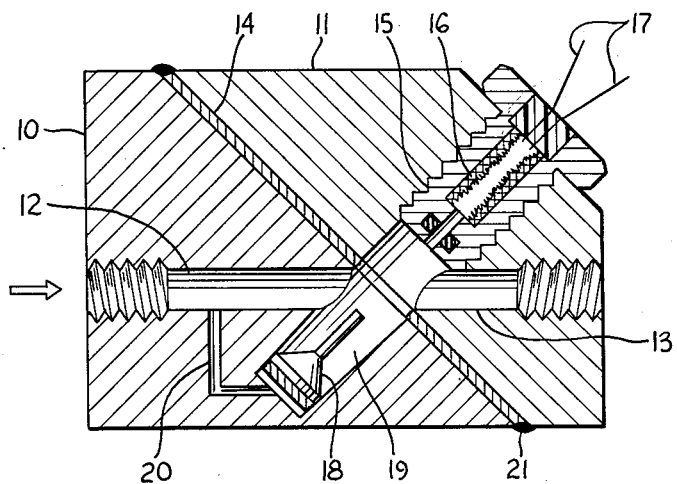
FIGURE 2 is a cross-sectional view of the valve in its operated or open condition.

In operation, fluid under pressure enters passage 12, chamber 19 and vent passage 20. It is hermetically sealed from the downwstream side of the valve by diaphragm 14 which is welded as shown at 21 to at least the upstream body portion 10 or to downstream body portion 11 as well, this second arrangement being that shown in the drawings. When it is desired that the valve should operate, an electric current is supplied through wires 17 to heat charge 16 and thus cause it to ignite. The resulting exposion forces ram 18 rapidly toward diaphragm 14 and causes it to break out or punch out a substantially round piece 14a of diaphragm material after which both the piece 14a (FIGURE 2) and the ram 18 move with great force into tapered chamber 19 where they become firmly wedged at a level in chamber 19 where neither will extend upward into the now open flow passage 12—13. The fluid in chamber 19 is pushed out of chamber 19 by the force of the entering piece 14a (FIGURE 2) and the ram 18 and it passes through internal vent passage 20 into inlet passage 12 where it joins the fluid therein under the influence of the great pressure force of the exploded charge. With passage 12—13 now open, fluid will flow through the valve freely.

It is to be understood that the form of the invention herewith shown and described is to be taken as a preferred example of the same and that various changes in the shape, size and arrangement of parts may be resorted to without departing from the spirit of the invention or the scope of the subjoined claims.

What is claimed is:

1. A valve comprising a mating upstream portion and a mating downstream portion, means for attaching said mating portions, a flow passage in each portion in substantial alignment with that in the other, an hermetically-sealed diaphragm interposed between said upstream and downstream portions and blocking the flow passages, said diaphragm being inclined with respect to the flow passage, a closed charge retaining chamber in said downstream portion exposed to said diaphragm at that area thereof which blocks the flow passage, an explosive charge in the charge retaining chamber, a ram in said chamber between the charge and the diaphragm, a tapered receiving chamber in the upstream body portion in substantial alignment with the ram and charge chamber, and large enough to wholly contain both the removed part of the diaphragm and the ram, vent means for said receiving chamber, and means for exploding said charge.

2. The invention set forth in claim 1 with the vent means comprising an internal passage to the inlet passage of the valve.

References Cited in the file of this patent

UNITED STATES PATENTS

| | | |
|---|---|---|
| 2,365,364 | Temple | Dec. 19, 1944 |
| 2,474,826 | Cantlin | July 5, 1949 |
| 2,712,881 | Mathisen | July 12, 1955 |
| 2,831,492 | Bising | Apr. 22, 1958 |
| 3,039,482 | Goldberg | June 19, 1962 |